May 8, 1934. G. L. HAMMON 1,958,085
NOZZLE TIP
Filed April 6, 1929 2 Sheets-Sheet 1
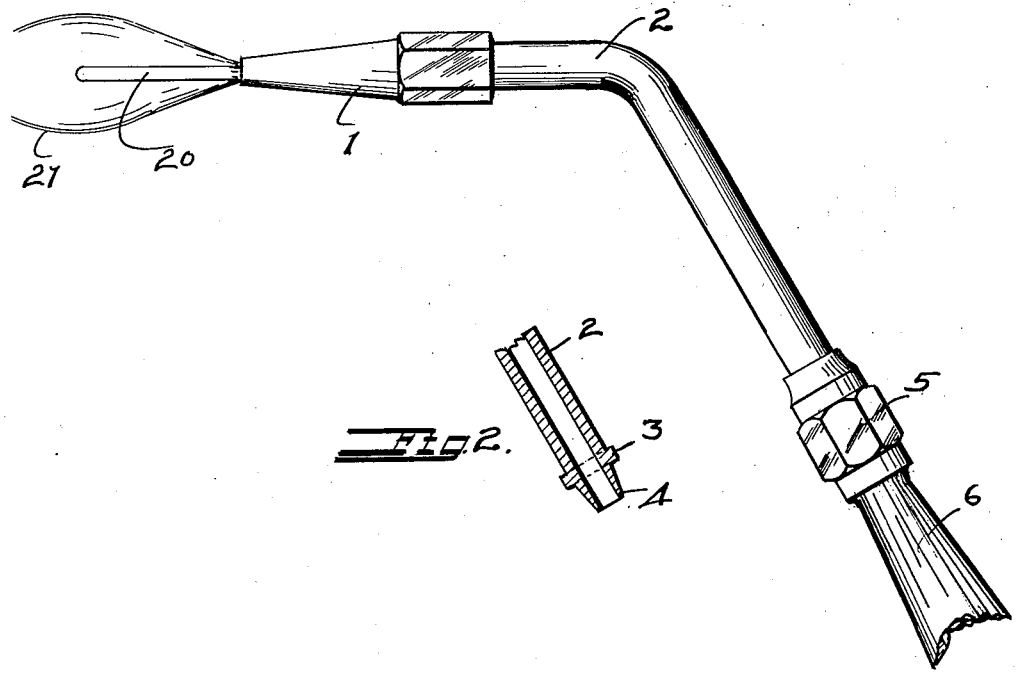
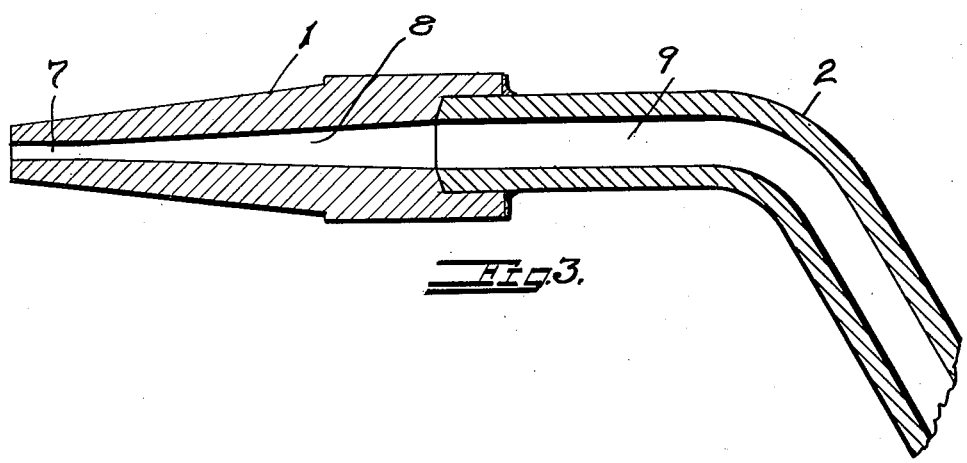
Inventor
George L. Hammon.
By Carlos P. Griffin
Attorney May 8, 1934.    G. L. HAMMON    1,958,085
NOZZLE TIP
Filed April 6, 1929    2 Sheets-Sheet 2
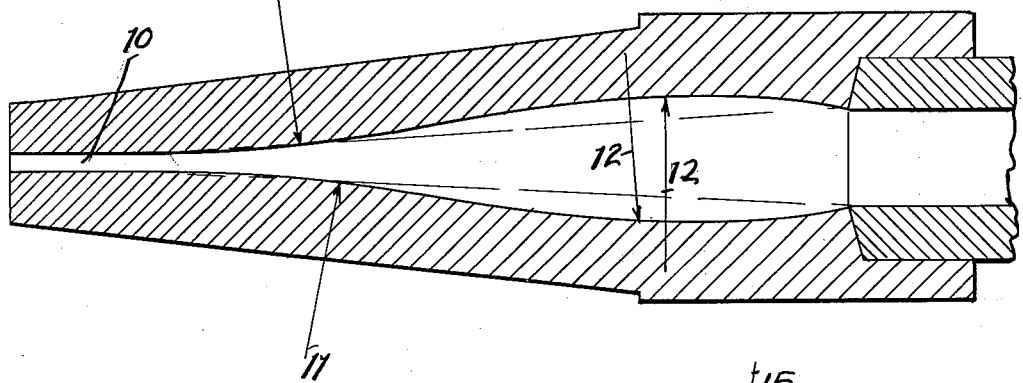
Fig. 4.
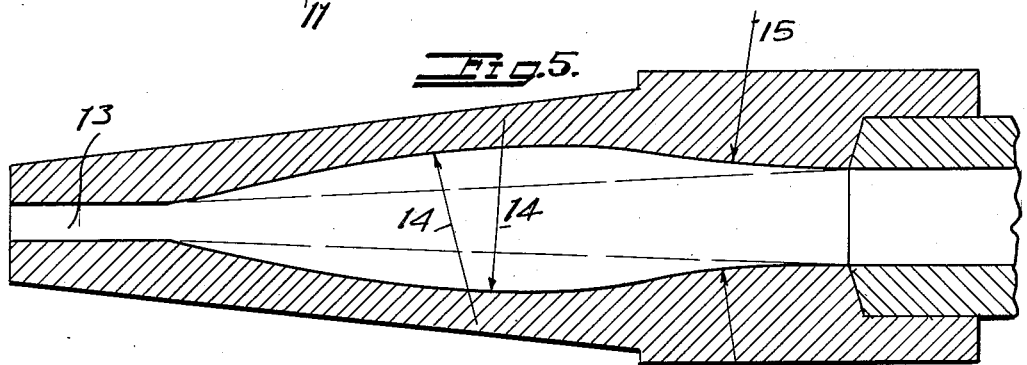
Fig. 5.
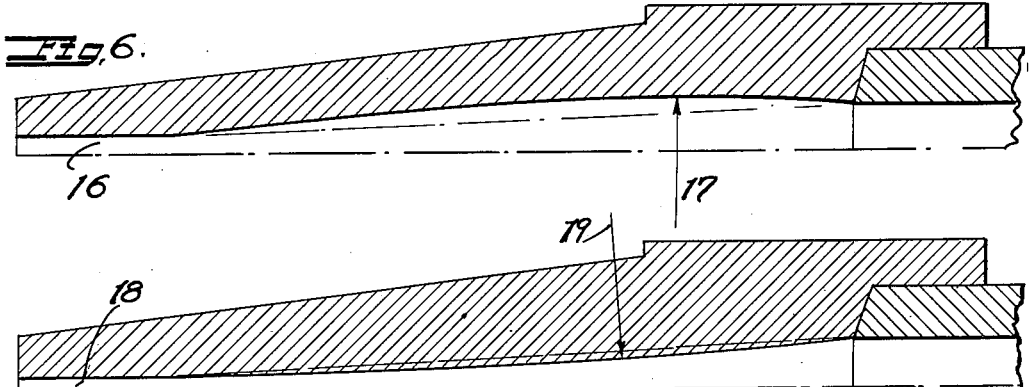
Fig. 6.
Fig. 7.
Inventor
George L. Hammon
By Carlos P. Griffin
Attorney Patented May 8, 1934

1,958,085

UNITED STATES PATENT OFFICE 1,958,085

NOZZLE TIP

George L. Hammon, San Francisco, Calif.

Application April 6, 1929, Serial No. 353,046

1 Claim. (Cl. 158—27.4)

This invention relates to improvements in nozzle tips for welding torches of the class using an oxygen and acetylene mixture, or oxygen and hydrogen ignited, and relates more particularly to the formation of the interior orifice and walls of the tip.

The object of the invention is to cause a smooth flow of the mixed gases through the tip whereby a longer inner welding cone may be produced and to prevent the breaking off of this cone in operation.

It is understood by those skilled in this art that what is termed the cone is the cylindrical flame about the size of the orifice in the end of the tip, and the length of this flame determines the efficiency of the torch, heretofore the length of this flame has been about one half to three quarters of an inch from the end of the tip, but with the improved form herein described, the length of this flame has been increased 100% and more.

Another object of this invention is to increase the efficiency of the tip by providing curved interior surfaces.

Another object is to provide a taper of not over five degrees and not less than one degree for best results.

Other objects of the invention will be apparent as the description proceeds.

An embodiment of the invention is shown in the accompanying drawings in which the same reference numeral is applied to the same portion throughout, but I am aware there may be modifications thereof.

Figure 1 is a view of a portion of a welding torch showing the nozzle tip in place, Figure 2 is a section of the coupling collar on the elbow pipe, Figure 3 is a section of the tip, and a portion of the elbow pipe, Figure 4 is a section of the tip having curved inner walls, and Figures 5, 6 and 7 show modified forms of curved inner walls.

The numeral 1 indicates a nozzle tip which is silver soldered to an elbow pipe 2. This pipe 2 has the end upset to form a collar 3 and taper portion 4 to form part of the union joint 5 to the mixer 6.

The interior of the tip 1 has the straight opening 7, and the long taper opening 8 which joins the opening 9 in the pipe 2.

In the form of the invention shown in Figures 4 to 7 inclusive the interior shown in Figure 4 consists of the straight portion 10, the convex curve 11 and the concave curves 12.

In the form shown in Figure 5 the straight orifice is shown at 13, the concave curve at 14, and the convex curve at 15.

Figure 6 shows a straight orifice 16 and a single concave curve 17, the upper half of the tip only being shown in Figures 6 and 7.

In Figure 7 the straight orifice is indicated at 18, and a single convex curve is shown at 19.

In operation the long taper or long curves without any obstruction or crevices where eddies of the mixed gases may form have proven to be most efficient in practice. The inner cone or welding flame is indicated at 20, and the outer cone at 21.

It may be added that the increased length of the inner core has an advantage of being able to keep the end of the tip further away from the molten metal when welding, and consequently the tip does not become overheated which is the cause of a majority of back fires and flashbacks.

Having thus described my invention, what I desire to secure by Letters Patent of the United States is as follows, but modifications may be made in carrying out the invention as shown in the drawings and in the above particularly described form thereof, within the purview of the annexed claim.

A nozzle tip for welding torches having a central passage therethrough and adapted to be fixed to the end of a mixed gas supply pipe, said passage being the same diameter as the interior of the supply pipe at the junction of said passage and pipe, said passage terminating in a restricted discharge opening at its other end of smaller diameter than the interior of said supply pipe, the walls of said passage being curved and increasing in diameter from adjacent the junction of the passage and supply pipe and then decreasing in diameter to said restricted discharge opening.

GEORGE L. HAMMON.